Nov. 15, 1927.

G. E. ZEILER 1,649,641

GLASS FORMING MACHINE

Filed April 6, 1922

WITNESSES

J. Herbert Bradley.

INVENTOR

George E. Zeiler
By Drew and McCallister
His Attorneys.

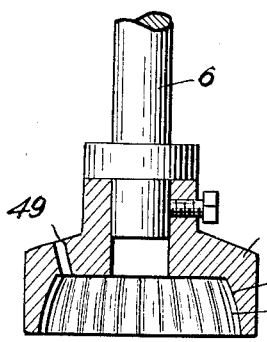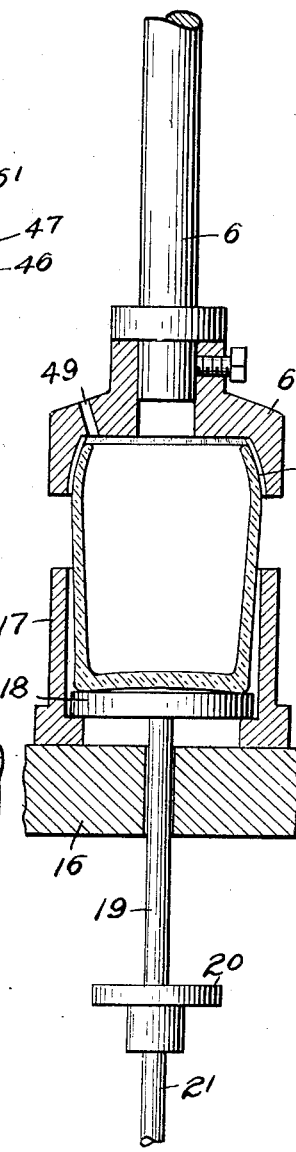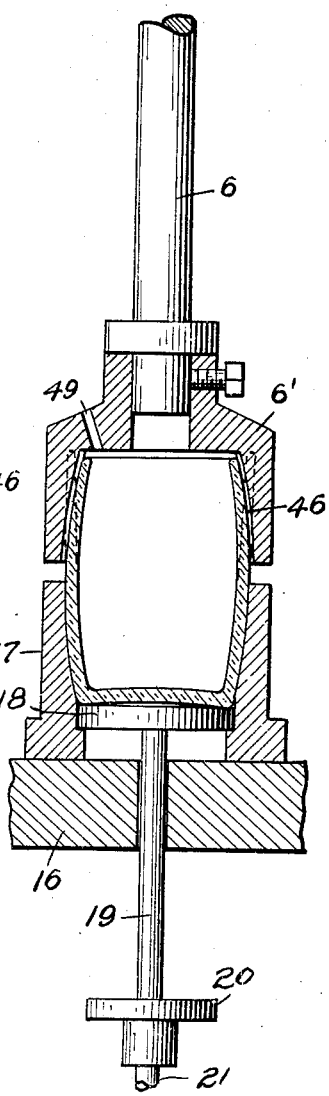

Patented Nov. 15, 1927.

1,649,641

UNITED STATES PATENT OFFICE.

GEORGE E. ZEILER, OF PITTSBURGH, PENNSYLVANIA.

GLASS-FORMING MACHINE.

Application filed April 6, 1922. Serial No. 550,004.

The invention relates to glass working machines and it has particular relation to machines for shaping glass receptacles while in a plastic state.

One of the objects of the invention is to provide a machine, of the character described, by means of which the final shaping operations may be automatically performed upon a partially formed glass receptacle in a plastic state.

Another object of the invention is to provide a machine, of the class described, that is particularly adapted to spin the upper or rim portion of glass tumblers in an inwardly direction, for the purpose of cupping the same.

With such objects in view, as well as other advantages which may be incident to the utilization of the improvements, the invention consists in the parts and combination thereof hereinafter set forth and claimed, with the understanding that the several necessary elements constituting the same may be varied in proportion and arrangement without departing from the nature and scope of the invention.

In order to make the invention more clearly understood, means are shown in the accompanying drawings, for carrying the same into practical effect, without limiting the improvements in their useful application, to the particular constructions, which, for the purpose of explanation, are made the subject of illustration.

In the accompanying drawings:—

Fig. 2 is a vertical sectional view, on a larger scale, through the forming tool or head and the co-acting receptacle supporting member having a glass tumbler disposed thereon, and with the various elements in their initial or raised positions.

Fig. 3 is a similar view with the forming tool in engagement with the upper portion of the tumbler and at the limit of its downward stroke.

Fig. 4 is a view similar to Fig. 2 but illustrating a forming tool adapted to impart a substantially barrel shape to a glass tumbler.

Figure 1:
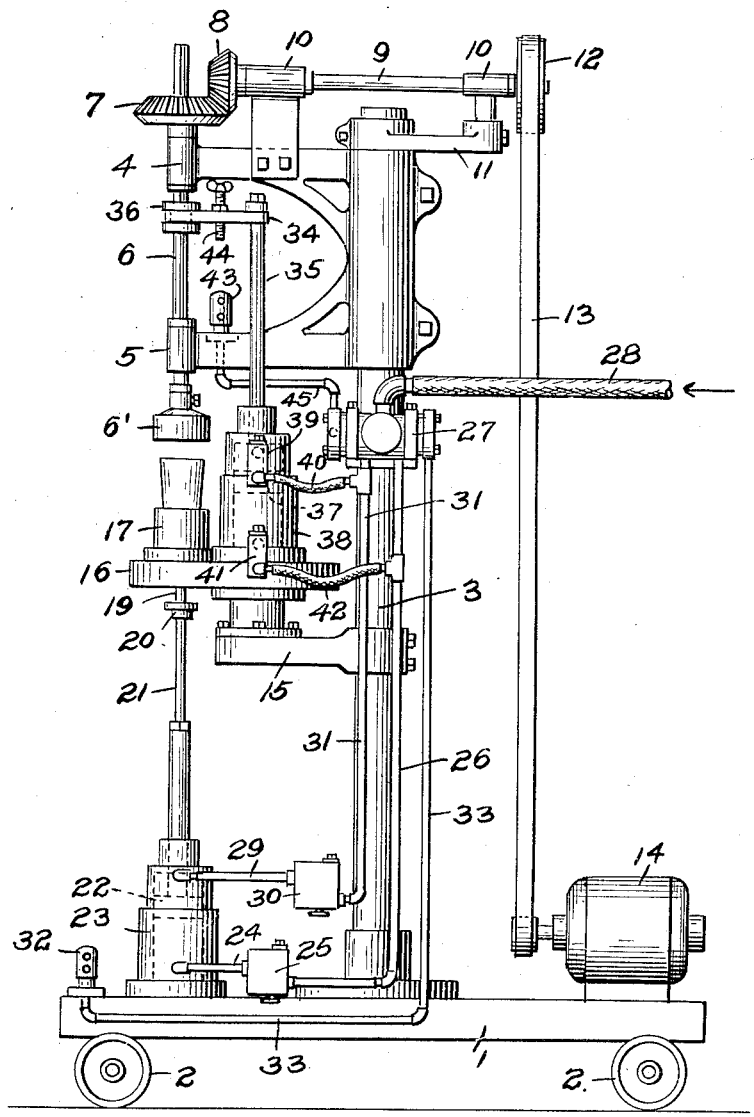
Figure 1 is a side elevational view of a glass-forming machine embodying the invention.

Referring to the drawings, a glass shaping machine embodying the invention is illustrated as comprising a base 1 which may be mounted upon wheels 2 if so desired to facilitate its portability. A pedestal or stand 3 is mounted upon the base 1 and is provided with upper and lower forwardly extending arms or brackets 4 and 5 respectively, which carry a vertically reciprocable and rotatable spindle 6.

The spindle 6 carries a detachable forming head 6' at its lower extremity and is rotated by means of a bevelled gear 7 splined to the upper portion thereof. The gear 7 and spindle 6 are driven by a bevelled pinion 8 fixed to the forward end of a horizontally extending power shaft 9, which is mounted in suitable bearings 10 carried by the upper arm 4 and a bracket 11 fixed to the upper portion of the pedestal 3. The shaft 9 is driven by means of a pulley 12 and a belt 13, from a suitable source of power, which is shown as comprising an electric motor 14 mounted upon the base 1.

A vertically adjustable bracket or arm 15 is mounted upon the pedestal 3 and carries a table 16 which extends beneath the spindle 6 and upon which a receptacle or housing 17 is mounted. A vertically movable supporting member 18, in the form of a plate or disk, is movably mounted within the housing 17 and is provided with a stem 19 which extends downwardly through an aperture in the table 16. The lower extremity of the stem 19 is detachably seated in a socket 20 carried by the upper extremity of a rod 21 fixed to a piston 22 which reciprocates within a cylinder 23 mounted on the base 1 of the machine.

Compressed air is admitted to the lower portion of the cylinder 23 to normally maintain the piston 22 and its associated parts, in a raised position, by means of a pipe 24 and reduction valve 25 from a pipe 26 which communicates with the rear end of a suitable automatic valve 27, preferably of the well known "Miller type". Air under pressure is supplied to the valve 27 from a pipe 28. Air is also admitted to the upper portion of the cylinder 23 when it is desired to lower the piston, by means of a pipe 29 and reducing valve 30 from a pipe 31 which communicates with the forward end of the valve 27. A bleeder valve 32 is mounted upon the base and in a position where it is easily accessible to the foot of the operator, and communicates with one side of the valve 27 by means of pipe 33.

When it is desired to lower the supporting member or plunger 18 to position an article within the housing 17 preparatory to operating thereon, the bleeder valve 32 is pressed downwardly by the operator which action permits sufficient air to escape from one side of the valve 27 to lower the pressure therein. The escape of air from one side of the valve 27 causes an unbalanced pressure therein which causes it to function in the well-known manner, to establish communication between the pipe 26 and the atmosphere and between the pipe 31 and the compressed air pipe 28. This action permits the air contained in the lower portion of the cylinder 23 to escape to the atmosphere and admits air under pressure to the upper portion of the cylinder. The piston 22, and its associated parts, are thereby caused to descend and to lower the tumbler into the housing 17. The spindle 6 and forming tool 6' are reciprocated in a vertical direction by means of a yoke 34 carried by the upper end of a rod 35, which engages a grooved collar 36 fixed to the spindle 6. The rod 35 extends downwardly and is fixed to a piston 37 mounted in a compressed air cylinder 38 carried by the table 16.

Air is admitted to the lower portion of the cylinder 38, to normally maintain the piston 37 and associated parts in a raised position, by means of a reduction valve 41 and pipe 42, which communicate with the pipe 26 and the valve 27. Air is also admitted to the upper portion of the cylinder 38, to lower the piston 37 and spindle 6 when desired, by means of a reduction valve 39 and pipe 40 which communicates with the pipe 31.

When the bleeder valve 32 is operated, as previously set forth, to cause the valve 27 to be actuated to lower the supporting member 18, the valve 27 simultaneously establishes communication between the lower portion of the cylinder 38 and the outside atmosphere and between the upper portion thereof and the source of compressed air. The spindle 6 and rapidly rotating forming tool 6' are therefore caused to descend simultaneously with the plunger 18.

The various reduction valves are, however, so adjusted that the air is admitted into and escapes from the cylinders 23 and 38 at different volumes with the result that the rotating spindle and forming tool 6' ascend and descend more rapidly than plunger 18, so as to insure that the glass article is seated before the forming tool 6' contacts therewith, and so that the operator can remove the article after being operated on.

A bleeder valve 43 is mounted upon the lower arm 5 of the pedestal 3 and in the path of movement of an adjustable valve actuating member 44 carried by the yoke 34, and establishes communication between the forward end of the automatic valve 27 and the outside atmosphere by means of a pipe 45. As the spindle 6 and forming tool 6' approach the predetermined limit of their downward stroke, the actuating member 44 engages and opens the valve 43 and actuates the automatic valve 27 in a manner similar to that described in connection with the valve 32, but in the opposite direction. The result is that communication is simultaneously established between the upper portion of the cylinders 23 and 38 and the outside atmosphere and between the lower portions thereof and the source of compressed air. The spindle 6 and forming tool 6' are therefore automatically raised out of engagement with the formed tumbler or other article and the plunger 18 simultaneously raises the same out of the housing 17 to a position from which it may be readily removed from the machine.

The forming tool or head 6' is shown as being of hollow construction and adapted to embrace the upper or rim portion of a tumbler to spin (cup) the same in an inward direction. The glass engaging surface of the tool 6' is provided with a plurality of inwardly projecting longitudinally extending ribs 46 having depressions or channels 47 therebetween and are adapted to engage the surface of the glass with a spinning action. The advantages of this construction are that the area of the forming tool which engages the tumbler is materially decreased and the friction between the tool and the glass consequently reduced without impairing the efficiency of the machine.

Air ducts 49 are provided in the tool 6' to prevent the formation of a vacuum with the article.

While a substantially cup-shaped forming tool adapted to engage the outer edge of an article has been shown and described, it will be understood that a tapered tool may be employed which is adapted to engage the inner edge of the article to form a flared opening, similar to the well-known "soda" glass, without departing from the spirit of the invention.

I claim:

1. A glass forming machine comprising a vertically movable forming member and a vertically movable member co-operating therewith adapted to support a plastic article and means for causing one of said members to move at a greater rate of speed than the other.

2. A glass forming machine comprising a vertically movable rotatable forming tool, a vertically movable member co-operating therewith adapted to support a plastic article and to lower the same within the path of movement of said forming tool and means for synchronizing the vertical movements of said forming tool and said supporting member with respect to each other.

3. A glass forming machine comprising a rotatable forming tool, a receptacle adapted to contain a plastic article, and a plunger disposed within said receptacle and adapted to raise said article with respect thereto simultaneously with the upward movement of said forming tool, but at a slower speed.

4. A glass forming machine comprising a vertically reciprocable and rotatable forming tool, a reciprocable member co-operating therewith adapted to support a plastic article for engagement by said forming tool, and means for causing said supporting member to lower said article at a slower rate of speed than the speed of said forming tool.

5. A glass forming machine including a vertically movable rotatable forming head, a receptacle adapted to contain a plastic article, a plunger for supporting said article within said receptacle and fluid pressure means for raising and lowering said forming head and plunger simultaneously at different speeds.

6. A glass forming machine including a vertically movable rotatable forming head, a fluid pressure actuated piston for reciprocating said forming head, a receptacle adapted to contain a plastic article, a plunger for supporting said article within the receptacle and a fluid pressure actuated piston for reciprocating said plunger at a slower speed than said forming head.

7. A glass forming machine having in combination, means for movably supporting a plastic article, a fluid pressure actuated forming head adapted to shape an article on said supporting means and an automatically operated valve for controlling the operation of said forming head and the movement of said supporting means.

8. A glass forming machine including a vertically movable rotating forming head, a receptacle adapted to contain a plastic article, a plunger for supporting said article within said receptacle and means for raising said forming head and plunger simultaneously at different speeds.

In testimony whereof, I have hereunto subscribed my name this 25th day of March, 1922.

GEO. E. ZEILER.